United States Patent [19]

Jones

[11] Patent Number: 5,745,292
[45] Date of Patent: Apr. 28, 1998

[54] OPTICAL DEVICES AND REFLECTION CONTROL TECHNIQUES

[75] Inventor: Peter W. J. Jones, Belmont, Mass.

[73] Assignee: Tenebraex Corporation, Boston, Mass.

[21] Appl. No.: 981,877

[22] Filed: Nov. 25, 1992

[51] Int. Cl.$^6$ .................. G02B 27/00; G02B 21/00
[52] U.S. Cl. .................. 359/613; 359/601; 359/611; 359/614
[58] Field of Search .................. 359/603, 614, 359/399, 401, 227–236, 601–615, 894, 591–593, 597, 627, 636, 726; 362/61, 290, 342, 354

[56] References Cited

U.S. PATENT DOCUMENTS

| | | | |
|---|---|---|---|
| 3,487,206 | 12/1969 | Dawson et al. | 359/619 |
| 3,536,391 | 10/1970 | Anderson et al. | 359/614 |
| 4,032,222 | 6/1977 | Lapeyre | 359/613 |
| 4,342,821 | 8/1982 | Galves et al. | 430/12 |
| 4,506,953 | 3/1985 | Shimizu et al. | 359/614 |
| 4,542,963 | 9/1985 | Linlor | 359/603 |
| 4,772,096 | 9/1988 | Kai et al. | 359/601 |
| 4,772,097 | 9/1988 | Takeuchi et al. | 359/601 |
| 4,929,055 | 5/1990 | Jones | 359/614 |
| 4,960,325 | 10/1990 | Witt, III | 359/603 |
| 5,004,320 | 4/1991 | Nagai et al. | 359/601 |
| 5,210,645 | 5/1993 | Orino et al. | 359/601 |
| 5,220,453 | 6/1993 | McKinley et al. | 359/614 |
| 5,331,473 | 7/1994 | Petersen | 359/894 |

FOREIGN PATENT DOCUMENTS

WO01313  6/1980  European Pat. Off. ........... 359/601

*Primary Examiner*—Thong Nguyen
*Attorney, Agent, or Firm*—Peter F. Corless; Dike, Bronstein, Roberts & Cushman, LLP

[57] ABSTRACT

The present invention relates to improved optical devices and reflection control techniques. In one aspect, the invention provides an optical device comprising an array of substantially tubular elements and one or more reflective surfaces, wherein at least one of the reflective surfaces positioned behind the tubular elements is tilted with respect to the optical path of the device. This orientation of the reflective surface results in incident light from a source in the field of view of the device being reflected from the tilted surface and captured by the array of elements, rather than the reflected light being projected outward from the device where it can be perceived by a viewer, particularly a viewer in the field of view.

28 Claims, 11 Drawing Sheets

OPTICAL DEVICES AND REFLECTION CONTROL TECHNIQUES

INTRODUCTION

The present invention relates generally to improved optical devices and methods for control of light reflections from reflective surfaces. In a preferred aspect, the invention relates to means and apparatus for reducing or eliminating reflections from a reflective filter or sensor of an optical device.

BACKGROUND OF THE INVENTION

Optical devices often contain one or more lenses or other reflective surfaces. For example, optical devices such as for ranging, guidance, communication or information gathering, such as binoculars, telescopes, periscopes, rifle scopes and the like, all contain one or more lenses that can reflect incident light.

Laser beam detection devices have found increased use in locating and/or ranging functions, particularly in military applications, and rely on analysis of reflected beams to detect and/or determine the position of an apparatus that contains a reflective surface, for example such optical devices as mentioned above. For instance, a scanning laser may be projected across a combat area to determine an enemy's location. Reflected laser beams from, e.g., a reflective surface of an optical device, can be analyzed to determine the location of the source of reflection.

Such scanning as well as targeting, ranging, designating and offensive lasers are capable of causing eye injury and, as a safety measure, soldiers and others who might be exposed to such beams frequently include dielectric or other filters in optical devices to prevent transmissions of harmful light to the eye. For example, laser protective filters have been incorporated into optical devices used in military settings, such as armored vehicle sights, binoculars and the like. The protective filters are often positioned behind one or more optical elements, e.g., behind one or more transparent or translucent lenses. Alternatively, the protective filters may be positioned in front of an optical device, i.e., in front of the outermost lens element of the device. In particular, to retrofit optical devices such as a scope to include a laser protective filter, often the only cost effective or practical place to put the filter is in front of the device.

While such laser protective filters can effectively block transmission of harmful electromagnetic radiation, the filters are typically highly reflective and thus can produce reflections of incident light, such as light of the dome of the sky, the sun or a scanning laser beam, that can be readily detected by a viewer. As used herein, the term viewer refers to both a person or an electronic electromagnetic radiation detection apparatus. Moreover, a protective filter positioned in the front of an optical device, such as in the case of a retrofitted device, is particularly prone to produce reflections that can be readily discerned by a viewer.

In military situations, reflections from certain sensors which are part of optical systems also can be a problem. These sensors, such as charged coupled devices in video cameras, are typically reflective surfaces, and thus can generate retro-reflections back through the optical system, much in the way that at night, reflections of light from a car's headlights can be seen from a cat's retina.

Such retro-reflections from a sensor element can be a serious problem, particularly in military situations. Systems are employed that scan a battlefield with a laser looking for retro-reflections such as from sensor elements located at the focal plane or other reflective surfaces within an optical system such as thermal sights and armor vehicle sights. The laser scanning systems use these retro-reflections from such optical devices to locate, identify and/or target the optical devices for offensive fire. It thus would be desirable to have means for reducing or essentially eliminating reflections of incident light.

A highly useful means for reducing light reflections from reflective surfaces has been disclosed in my U.S. Pat. No. 4,929,055, issued on May 29, 1990, incorporated herein by reference. This patent discloses, inter alia, use of an array of tubular elements in front of a reflective surface to reduce reflections from the surface.

The techniques disclosed in U.S. Pat. No. 4,929,055, while generally reducing most reflections from an external source which is not in the direct field of view of an optical device (e.g., off-axis light sources) may not in some applications sufficiently reduce reflections of light originating from a source within the field of view of the device. In this situation the angle of incidence and thus the angle of reflection will be small; consequently light reflected from the reflective surface may be projected outwardly through the array of tubular elements rather than into the walls thereof. More particularly, it is sometimes possible for an observer inside the field of view of the optical device to see glimmer or glare which is the reflection of the bright dome of the sky. Similarly and as discussed above, incident light such as a scanning laser beam from a source inside the field of view of an optical device can be reflected from a reflective element such as a filter or sensor of the device, outwardly through such tubular elements.

It is thus desirable, now, to devise a technique for more effectively reducing such reflections from a light source in the field of view of an optical device.

SUMMARY OF THE INVENTION

The present invention provides novel means and apparatus that reduce or essentially eliminate light reflections from reflective surfaces.

More particularly, the invention provides an optical device comprising an array of substantially tubular elements and one or more reflective surfaces, wherein at least one of said reflective surfaces located behind the tubular elements is tilted to a non-orthogonal position with respect to the axis of the optical system whereby outward reflections of incident light from a source within the device's field of view are substantially reduced or essentially eliminated. Typically the reflective surface is tilted from an axis that is perpendicular to the longitudinal axis of the tubular elements, i.e., the reflective surface is positioned along an axis that is non-orthogonal to the longitudinal axis of the tubular elements.

The present invention will have utility in a wide range of applications, including reducing reflections from optical devices that contain reflective surfaces such as electromagnetic radiation filters and charge coupled elements and other sensor elements.

DETAILED DESCRIPTION OF THE INVENTION

Figure 1:
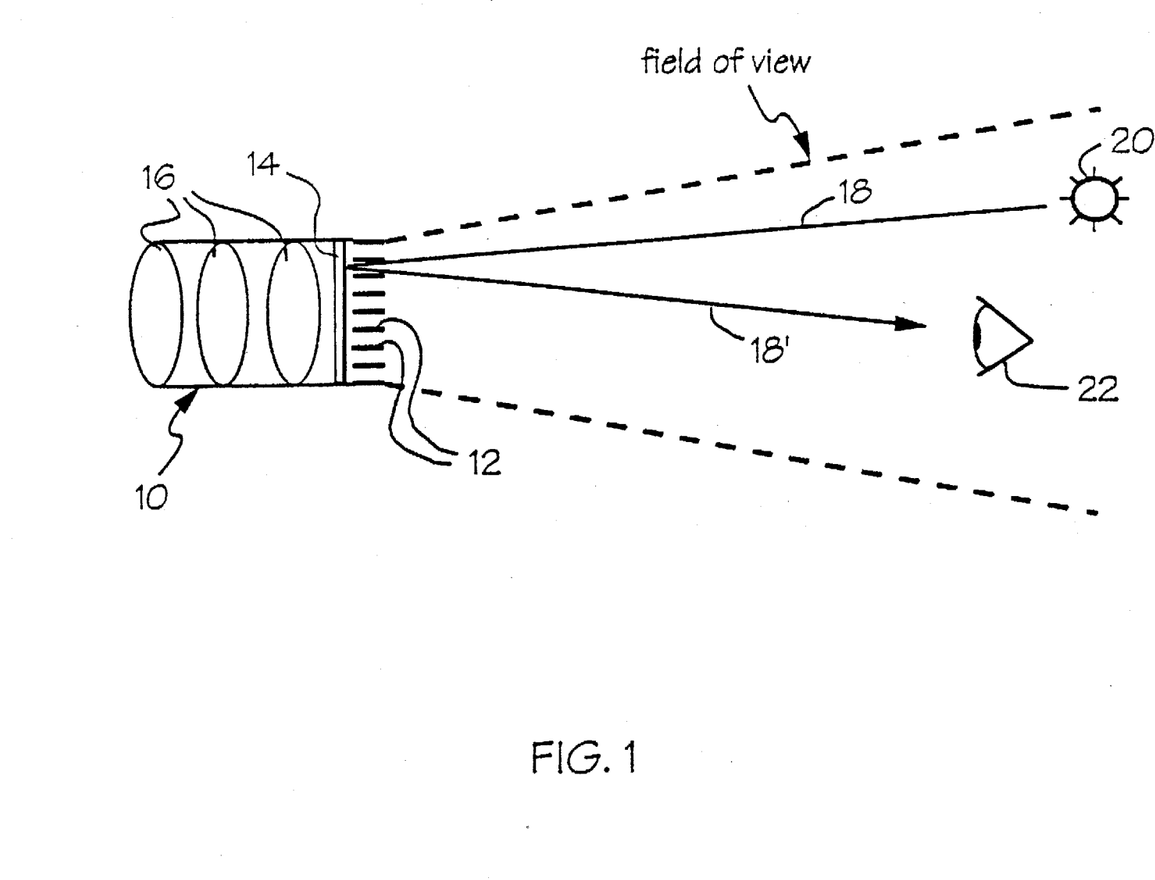
FIGS. 1 and 2 depict situations wherein light from a source in the field of view of an optical device can produce reflections discernable by a viewer in said field of view.
Figure 2:
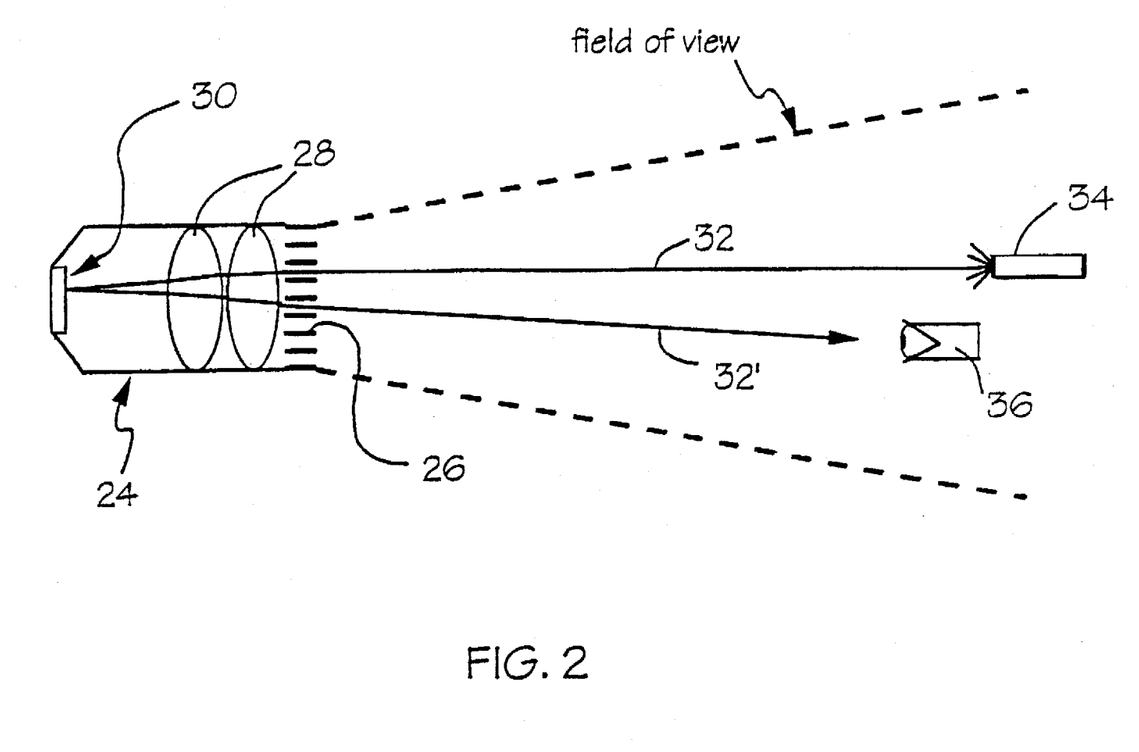

It has been found that for an optical device that contains one or more reflective surfaces such as binoculars, a scope for a rifle or an armored vehicle sight that is fitted with an array of tubular elements in accordance with U.S. Pat. No. 4,929,055, reflections of incident light from a source in the field of view of the device still may be perceived by a viewer positioned in said field of view. For example, reference is made to FIG. 1 of the drawings which shows optical device 10 comprising array of tubular elements 12, especially reflective surface 14, and plurality of lenses 16. Reflective surface 14 may be, e.g., a laser protective filter or an additional lens element. Tubular elements for use in accordance with the present invention are described in my U.S. Pat. No. 4,929,055 and below. Optical device 10 may be e.g., a scope for a rifle or an armored vehicle sight. Incident light rays 18 from light source 20 in the depicted field of view of device 10 are reflected from surface 14 and projected through elements 12 wherein reflected rays 18' can be perceived by viewer 22 in said field of view. Examples of light source 20 include the sun as specifically depicted in FIG. 1, a laser beam scanning apparatus, or the bright dome of the sky. Similarly, FIG. 2 shows a particular embodiment wherein optical device 24 comprises array of tubular elements 26, lenses 28 and reflective sensor element 30. It is common that a sensor element is the last element in an optical path of a device as depicted in FIG. 2. In particular, it is common that a lens element is not positioned behind a sensor element in a device. Device 24 may be a video camera or other apparatus that contains reflective sensor element 30 such as a charge coupled device. Incident laser beam 32 from scanning laser device 34 in the field of view of device 24 is reflected from element 30, and reflected rays 32' are projected through tubular elements 26 to viewer 36.

I have now discovered that such reflections of light from a source in an optical device's field of view can be substantially reduced if not essentially eliminated by tilting a reflective surface with respect to the orientation of the optical system in which it is contained. Typically such reflections can be reduced by positioning the reflective surface along an axis that is non-orthogonal to the longitudinal axis of a proximate array of tubular elements. For example, as shown in FIG. 3, which depicts optical device 40 comprising an array of tubular elements 42, lenses 44 and especially reflective surface 46 (e.g., a laser protective filter or a reflective sensor element), tilting of surface 46 with respect to orientation of the optical system, in particular the orientation of the tubular elements, effectively increases the angle of incidence of incident light 48 of light source 50 and transmits reflected light 48' into the walls of tubular elements 42 rather than projecting the light outwardly through said array to viewer 52.

Preferably a reflective surface is tilted in accordance with the present invention to the extent that at least a substantial portion of the light reflected from the surface is not outwardly projected from an optical device to a viewer, but rather such reflected light is captured by the array of tubular elements. More preferably the reflective surface is positioned so that essentially all of the light reflected from the surface is not outwardly projected from the device. Specifically preferred is where the reflective surface is tilted so that angle 54, as shown in FIG. 3, is greater than or about equal to angle 56 formed by the walls and endpoints of a tubular element as shown in FIG. 3. As used herein, "angle theta" refers to and is defined as the angle a reflective surface is tilted from an axis perpendicular to the longitudinal axis of array of tubular elements, e.g., angle 54 in FIG. 3; and "angle alpha" refers to and is defined as the angle between the wall of a tubular element and the line tangential to both of the opposite corners of said element wall and the opposing element wall. This relationship is further illustrated in FIG. 4 where reflective surface 58 of optical system 60 positioned in front of lenses 61 is shown tilted to the extent of angle theta 62 with respect to proximate array of tubular elements 64. The tubular elements can be said to have a ratio of length to width defined by angle alpha. The arrow labeled "x" represents the direction of the longitudinal axis of tubular elements 64.

Figure 3:
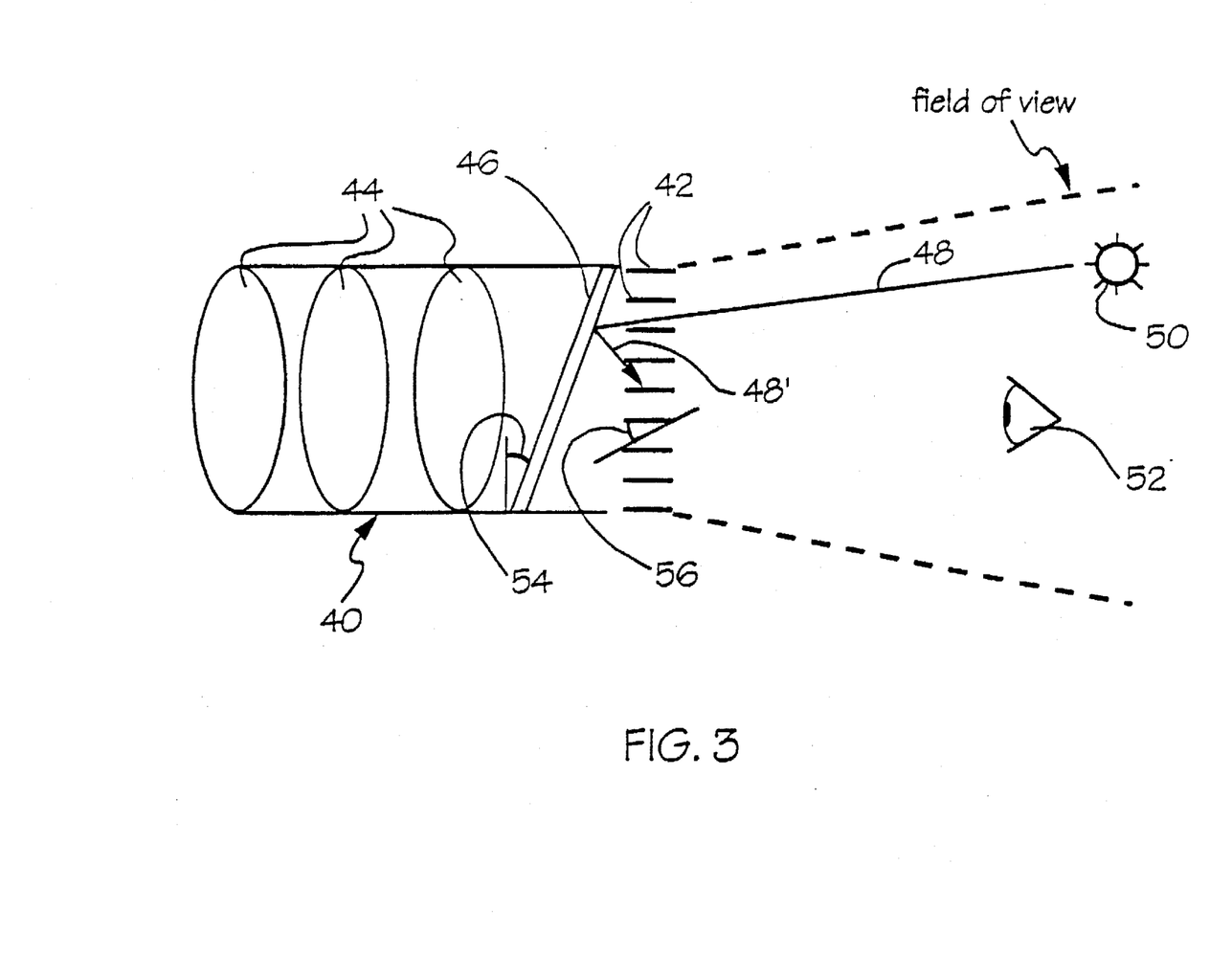
FIG. 3 depicts tilting of a reflective surface to reduce reflections in accordance with the invention.
Figure 4:
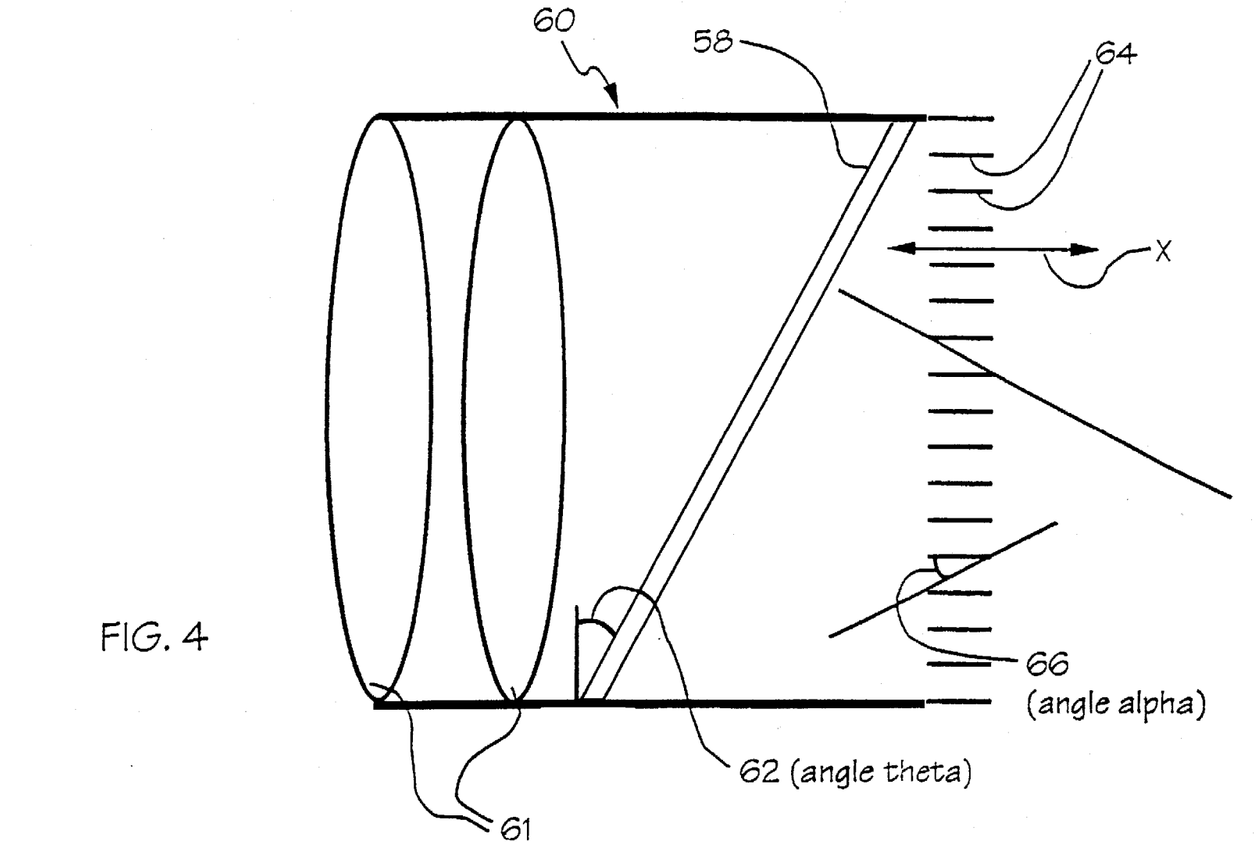
FIG. 4 further depicts a reflective surface tilted with respect to an array of tubular elements.
Figure 5A:
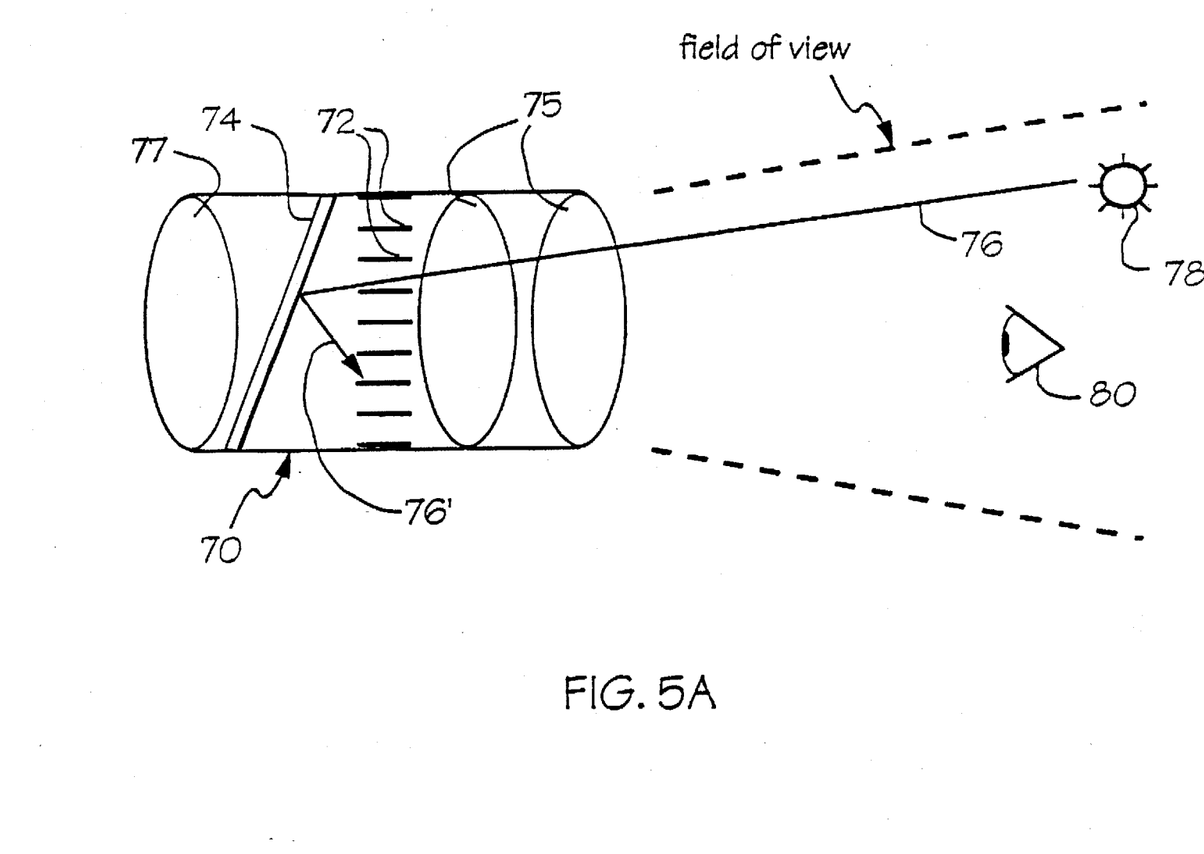
FIGS. 5A–5C depict further particular exemplary optical systems comprising a tilted reflective surface in accordance with the invention.

While FIG. 3 shows an array of tubular elements and tilted reflective surface positioned in front of the outermost lens element of device 40 such as may the case with a device that is retrofitted to include such elements, optical systems of other configurations are all within the scope of the present invention. For example, FIG. 5A illustrates optical device 70 which has array of tubular elements 72 and especially reflective surface 74 positioned behind transparent lenses 75 and in front of lens 77. Reflective surface 74, which may be, e.g., a laser protective filter or a reflective sensor element, is tilted with respect to the optical axis of device 70, more specifically tilted along an axis that is non-orthogonal with respect to the longitudinal axis of array of tubular elements 72. Again, preferably angle theta formed by reflective surface 74 is greater than or about equal to angle alpha of elements 72. As shown in FIG. 5A, this configuration results in incident light 76 from light source 78 in the depicted field of view of device 70 being reflected from surface 74 wherein reflected light rays 76' are projected into the walls of elements 72 rather than outwardly to viewer 80 positioned in said field of view.

Figure 5B:
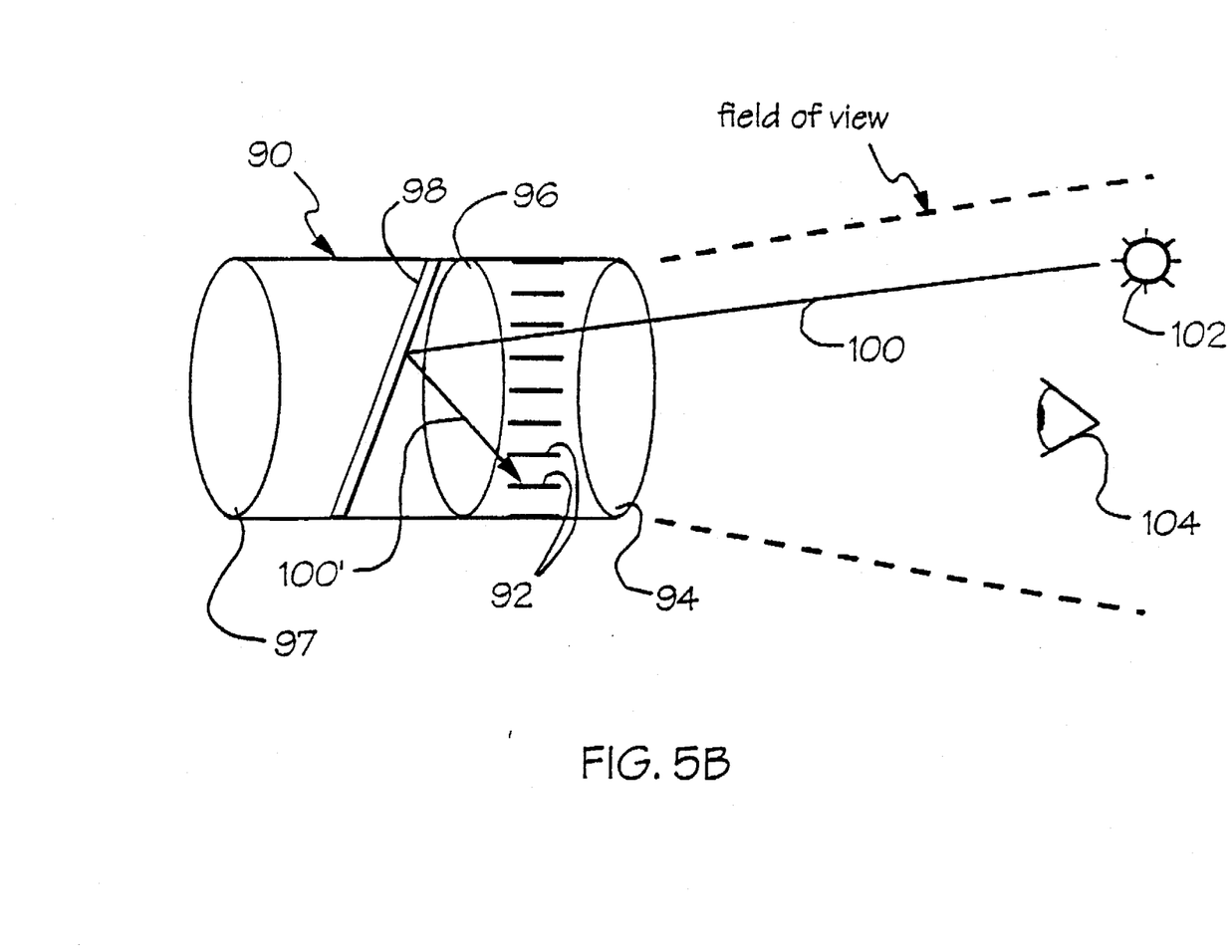

A further optical system is shown in FIG. 5B wherein optical device 90 contains an array of tubular elements 92 positioned between lens elements 94 and 96. Reflective surface 98 such as a laser protective filter or a sensor is positioned directly behind lens 96 and in front of lens 97 and tilted with respect to the optical axis of device 90. Again this configuration results in incident light 100 from light source 102 positioned in the depicted field of view of device 90 being reflected from surface 98 wherein reflected light rays 100' are projected into elements 92 rather than outwardly from device 90 to viewer 104.

Figure 5C:
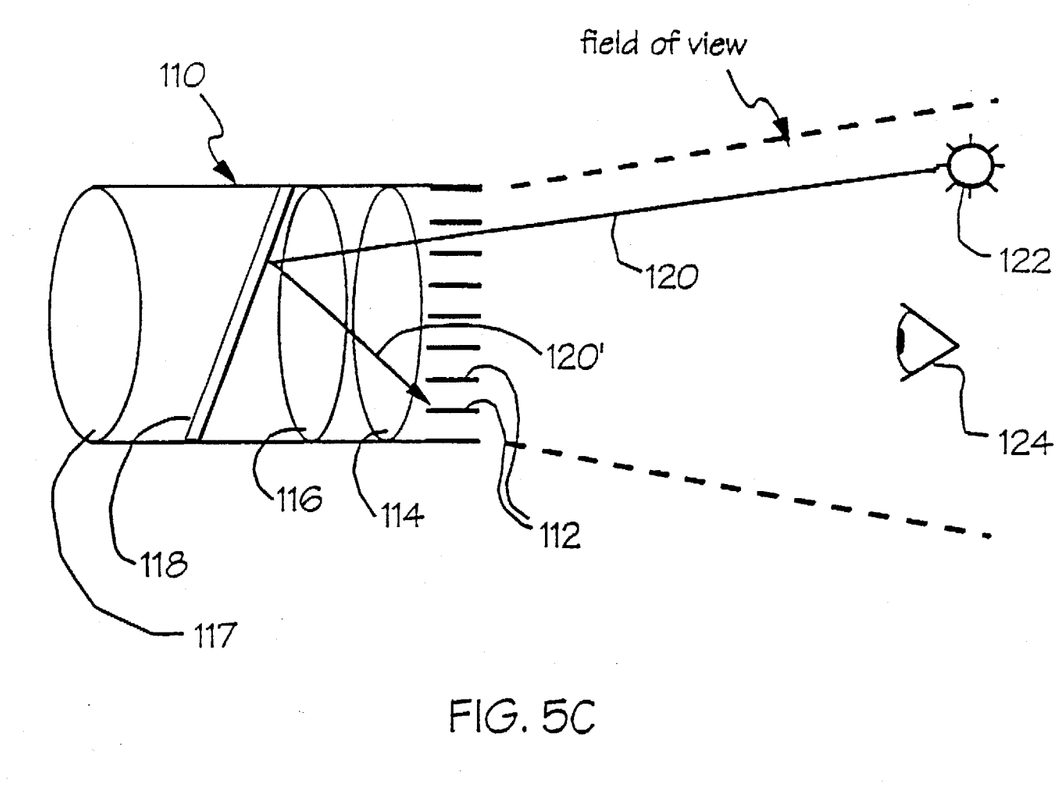

FIG. 5C depicts a yet further optical device 110 wherein array of tubular elements 112 is positioned in front of the outermost lens 114 of the device as well as in front of lens 116. Reflective surface 118 is positioned behind lenses 114 and 116 and in front of lens element 117 and tilted with respect to the orientation of the optical system of device 110 to an axis that is non-orthogonal with respect to the longitudinal axis of the tubular elements. By this configuration, incident light 120 from source 122 in the device's field of view is not outwardly projected from device 110 to viewer 124.

It is understood that the above discussed optical systems are exemplary only and other systems are all within the scope of the invention. For example, it will be appreciated that in certain optical systems one or more of the lens elements depicted in FIGS. 5A–5C will be suitably absent, or one or more additional optical elements including illuminating elements such as a light source may be added to the systems. In particular, if the especially reflective surface in each of those figures is a sensor element, the rear lens element, i.e., lens 77, 97 and 117 in FIGS. 5A–5C respectively, may be suitably absent from the device.

In some optical systems such as a periscope incident light may change directions one or more times within the system by means of mirrors, prisms and the like. The present invention encompasses tilting of a reflective surface in such optical systems in addition to devices having a substantially linear optical path such as the devices depicted in FIGS. 5A–5C. As with the systems depicted in FIGS. 5A–5C, in the case of devices wherein the optical axis of the system changes direction one or more times, a reflective surface will be tilted with respect to the system's optical axis so that outward reflections of light from a source in the device's field of view can be captured by the array of tubular elements and not projected outward to a viewer in the field of view.

Figure 6:
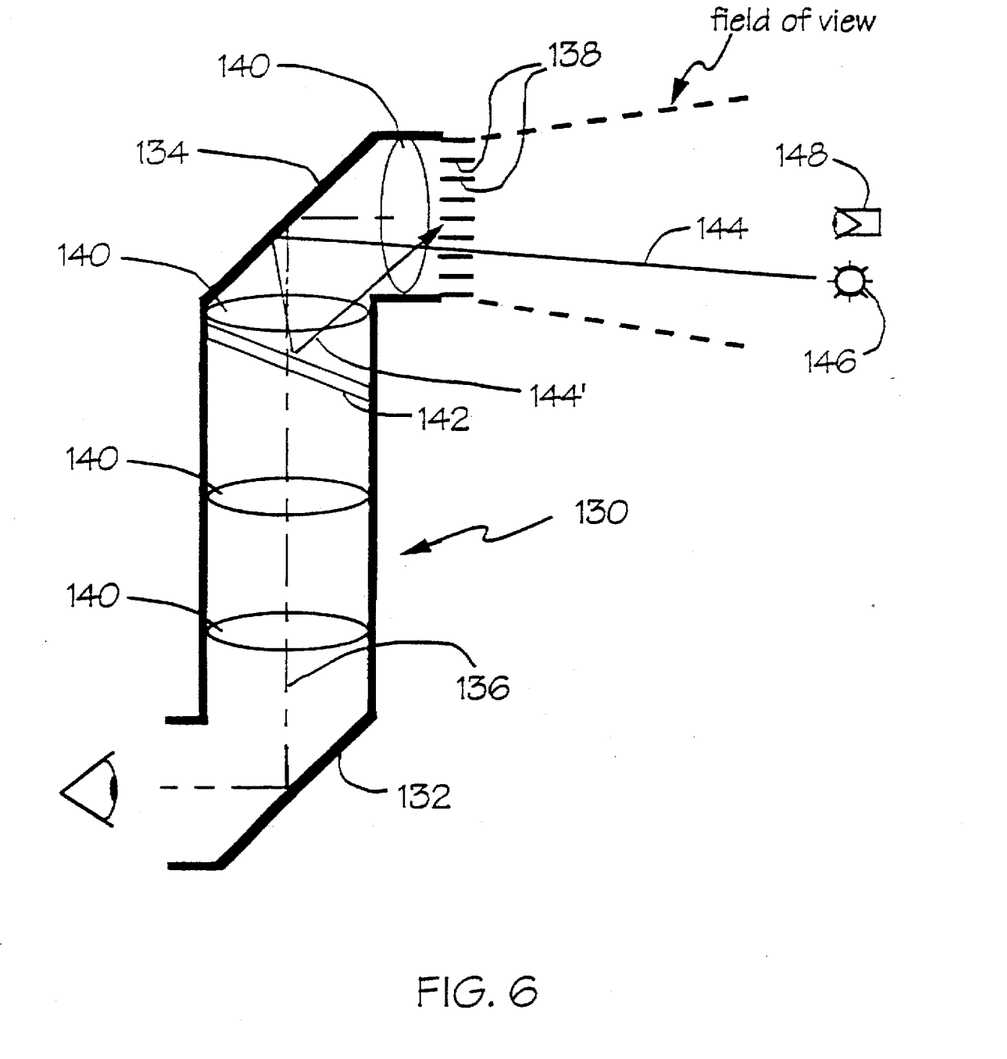
FIG. 6 depicts a still further optical system having a non-linear optical path and a tilted reflective surface in accordance with the invention.

For example, FIG. 6 depicts periscope 130 which is designed so that the orientation of the optical system changes direction two times by means of mirrors 132 and 134. The optical axis of the system is indicated by dashed line 136. Periscope 130 comprises an array of tubular elements 138 and plurality of lens elements 140. Reflective surface 142, which may be e.g. a laser protective filter, is tilted with respect to the orientation of the optical system of device 130, i.e., tilted or non-orthogonal with respect to axis 136 as well as the longitudinal axis of tubular elements 136. As a result of this configuration, incident light 144 from light source 146 positioned in the field of view of device 130 is reflected from surface 142 wherein reflected light rays 144' are not projected outwardly from device 130 to viewer 148 positioned in said field of view.

Preferably a reflective surface tilted in accordance with the invention has a substantially or essentially flat front surface to provide the most effective projection of incident light.

Figure 7:
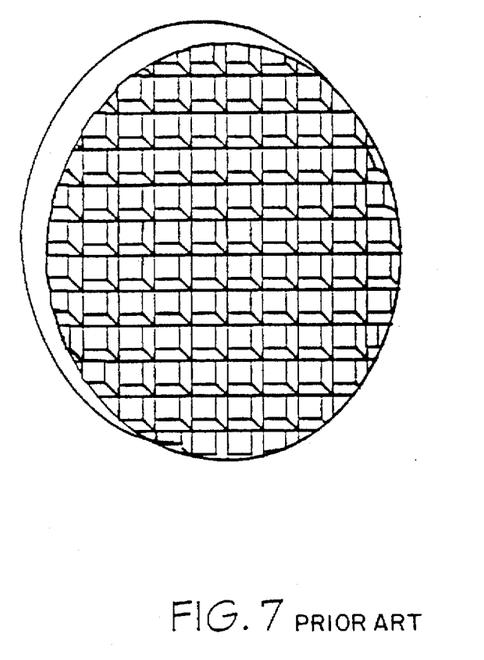
FIG. 7 depicts a particular exemplary embodiment of an array of tubular elements for use in accordance with the invention.
Figure 8:
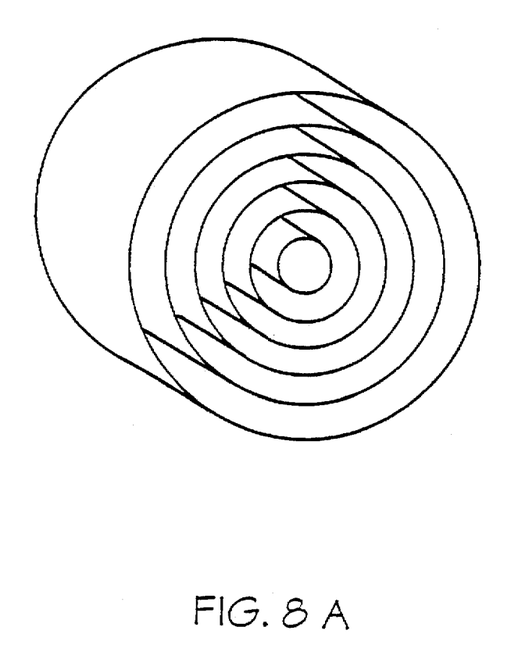
FIGS. 8A and 8B depict other particular exemplary embodiments of an array of tubular elements for use in accordance with the invention.
Figure 8B:
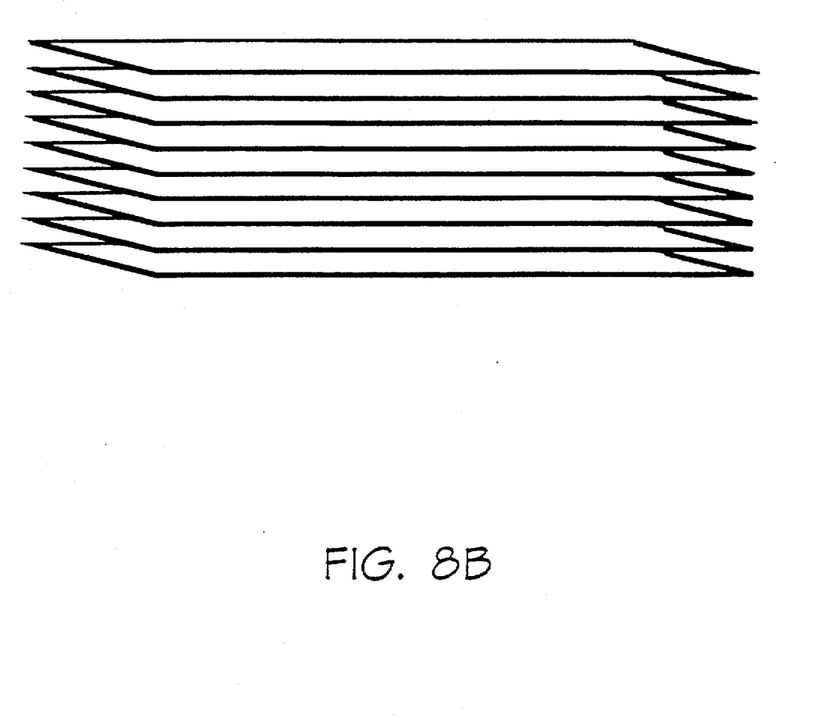

Suitable tubular elements and the general use thereof for purposes of the present invention are generally disclosed in U.S. Pat. No. 4,929,055. As used herein the term tubular element is deemed to mean an element of a generally tubular configuration having any selected geometrical shape. Although in the configuration of tubular elements as depicted in FIG. 7 the elements are essentially square in cross-section, other shapes can be used, e.g., other rectangular configurations, a triangular configuration, a hexagonal configuration, or the like, as long as such elements are capable of being nested together to form a structure that inhibits transmission of reflected light as contemplated herein. In still further exemplary embodiments the elements may be in the form of concentric circular elements as depicted in FIG. 8A or may use parallel vanes extending only in one direction, e.g., horizontal vanes which extend across the entire diameter of an optical device, as shown in FIG. 8B. The term tubular elements is also intended to include the latter configurations. It is typically preferred that the tubular elements are positioned to be substantially orthogonal to the optical system in which they are used. For example, as shown in FIG. 3 elements are substantially orthogonal to lenses 44 (but not reflective surface 46). It is also may be desirable to arrange the tubular elements so that the plane of the front or rear of the tubular array is not perpendicular to the longitudinal axis of the tubular elements of the array.

Figure 9A:
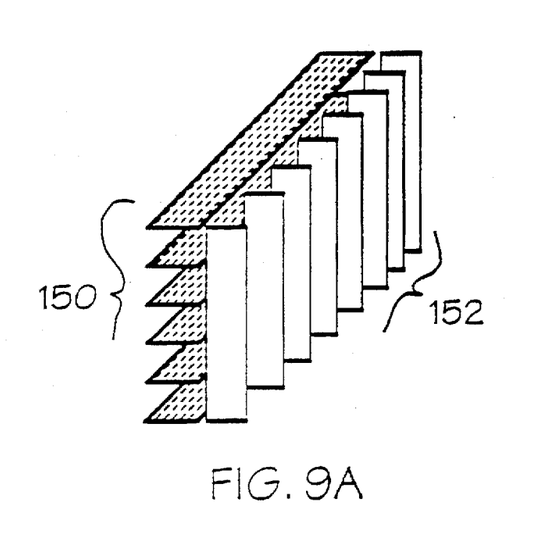
FIGS. 9A and 9B depict still further particular exemplary embodiments of an array of tubular elements for use in accordance with the invention.
Figure 9B:
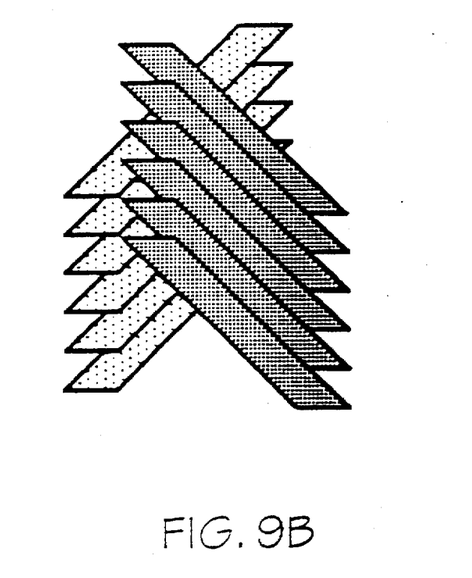

Other preferred configurations of tubular elements include those where vanes 150 are placed in a different, but adjacent plane from the plane 152 in a manner as shown in FIG. 9A. Another preferred array is shown in FIG. 9B where both sets of orthogonally related vanes can be arranged at 45 degree angles from a horizontal orientation so that, during normal use, water can be readily drained through both sets thereof. To further assist such drainage, the vanes can be coated with a suitable hydrophilic material.

Preferably, in order to provide the most effective reduction in reflections from a reflective surface of an optical device, the aspect ratio of each of the tubular elements has a selected relationship to the aspect ratio of the field of view of such optical device. More preferably the aspect ratio of the tubular element is made substantially equal or less than the aspect ratio of the field of view of the optical device with which it is used. See U.S. Pat. No. 4,929,055. In some applications, a lesser reduction in reflections can be tolerated while still providing useful results. Thus, in some cases the aspect ratio of the tubular elements need not be substantially the same as the aspect ratio of the field of view of the optical device with which they are used.

The foregoing descriptions of various embodiment of the invention are merely illustrative thereof, and it is understood that variations and modifications can be made by those skilled in the art without departing from the spirit or scope of the invention. Hence, the invention is not to be construed as limited thereto, except as defined in the appended claims.

What is claimed is:

1. An optical device having an optical axis and a field of view, comprising:
an array of substantially tubular elements positioned in front of a reflective surface, the reflective surface being tilted to a non-orthogonal position with respect to the optical axis of the device wherein at least a substantial portion of light from a source in the field of view of the device and reflected from the surface is not projected outward from the device.

2. An optical device in accordance with claim 1 wherein essentially all of the light from a source in the field of view of the device and reflected from the surface is not projected outward from the device.

3. An optical device in accordance in claim 1 wherein at least a substantial portion of light from a source in the field of view of the device and reflected from the surface is captured by the array of tubular elements.

4. An optical device in accordance with claim 1 wherein the reflective surface is positioned along an axis that is non-orthogonal to a longitudinal axis of the tubular elements.

5. An optical device in accordance with claim 1 wherein angle theta of the reflective surface is greater than or about equal to angle alpha of the array of tubular elements.

6. An optical device in accordance with claim 1 wherein the device further comprises one or more additional lens elements.

7. An optical device in accordance with claim 6 wherein the array of tubular elements and reflective surface are positioned in front of one or more lens elements of the device.

8. An optical device in accordance with claim 6 wherein the array of tubular elements and the reflective surface are positioned in front of the outermost lens element of the device.

9. An optical device in accordance with claim 6 wherein the array of tubular elements and the reflective surface are positioned behind one or more lens elements.

10. An optical device in accordance with claim 9 wherein a lens element is not positioned between the array of tubular elements and the reflective surface.

11. An optical device in accordance with claim 9 wherein one or more lens elements is positioned between the array of tubular elements and the reflective surface.

12. An optical device in accordance with claim 6 wherein one or more lens element is positioned between the array of tubular elements and the reflective surface.

13. An optical device in accordance with claim 6 wherein the array of tubular elements is positioned in front of the outermost lens element of the device and the reflective surface is positioned behind one or more lens elements of the device.

14. An optical device in accordance with claims 7 or 8 wherein the device has been retrofitted to incorporate the tubular elements and reflective surface.

15. An optical device in accordance with claims 6, 7, 8, 9, 10, 11, 12 or 13 wherein a filter element comprises the reflective surface.

16. An optical device in accordance with claims 6, 7, 8, 9, 10, 11, 12 or 13 wherein an electromagnetic radiation filter comprises the reflective surface.

17. An optical device in accordance with claims 6, 7, 8, 9, 10, 11, 12 or 13 wherein a laser protective filter comprises the reflective surface.

18. An optical device in accordance with claims 6, 9, 10, 11, 12 or 13 wherein a sensor element comprises the reflective surface.

19. An optical device in accordance with claim 18 wherein a lens element is not positioned behind the sensor element.

20. An optical device in accordance with claims 1, 2, 3, 5 or 6 wherein the device has a substantially linear optical axis.

21. An optical device in accordance with claims 1, 2, 3, or 5 wherein the optical axis of the device changes direction one or more times.

22. An optical device in accordance with claim 21 wherein the device is a periscope.

23. An optical device in accordance with claim 1 where the device is selected from the group consisting of a scope and a sight.

24. An optical device in accordance with claim 1 wherein the light source in the field of view is a scanning light source.

25. An optical device in accordance with claim 1 wherein the light source in the field of view is a scanning laser beam.

26. An optical device in accordance with claim 1 wherein the array of tubular elements are formed from a first plurality of parallel vanes and a second plurality of parallel vanes, the second plurality of vanes positioned in a different but adjacent plane from a plane of the first plurality of vanes.

27. An optical device in accordance with claim 1 wherein the array of tubular elements are formed from a first plurality of parallel vanes and a second plurality of parallel vanes arranged orthogonally to said first plurality of vanes, and said first and second plurality of vanes being at substantially a 45 degree angle with respect to a horizontal orientation.

28. An optical device in accordance with claim 1 wherein the reflective surface is tilted so that at least a substantial portion of light from a source positioned anywhere in the field of view of the device and reflected from the surface is not projected outward from the device.

* * * * *